(12) United States Patent
Agari

(10) Patent No.: US 6,190,046 B1
(45) Date of Patent: Feb. 20, 2001

(54) LINEAR MOTION GUIDE UNIT WITH LUBRICATING PLATE ASSEMBLY

(75) Inventor: Norimasa Agari, Gifu-ken (JP)

(73) Assignee: Nippon Thompson Co., Ltd., Tokyo (JP)

( * ) Notice: Under 35 U.S.C. 154(b), the term of this patent shall be extended for 0 days.

(21) Appl. No.: 09/348,568

(22) Filed: Jul. 7, 1999

(30) Foreign Application Priority Data

Jul. 14, 1998 (JP) .................................................. 10-199322

(51) Int. Cl.⁷ .................................................. F16C 29/06
(52) U.S. Cl. .................. 384/13; 384/15; 384/43; 384/45
(58) Field of Search ................ 384/13, 15, 16, 384/12, 43, 44, 45

(56) References Cited

U.S. PATENT DOCUMENTS

| | | | |
|---|---|---|---|
| 5,399,023 | * 3/1995 | Winkelmann et al. | 384/13 |
| 5,492,413 | * 2/1996 | Tsukada | 384/15 |
| 5,547,285 | * 8/1996 | Hutzel et al. | 384/15 |
| 5,590,965 | * 1/1997 | Yabe et al. | 384/15 |
| 5,678,927 | * 10/1997 | Yabe et al. | 384/13 |
| 5,857,779 | * 1/1999 | Tsukada et al. | 384/15 |
| 5,967,667 | * 10/1999 | Yatsu | 384/13 |

FOREIGN PATENT DOCUMENTS

| | | |
|---|---|---|
| 3-061046 | 9/1991 | (JP) . |
| 7-004952 | 1/1995 | (JP) . |

* cited by examiner

Primary Examiner—Thomas R. Hannon
(74) Attorney, Agent, or Firm—Browdy and Neimark

(57) ABSTRACT

A linear motion guide unit in which lubricating plate assemblies may be mounted and demounted with no needs of modification in the basic specifications. The linear motion guide unit comprises a round track shaft and a slider surrounding around the track shaft for sliding movement along the track shaft. Lubricating plate assemblies are each composed of a lubricant-containing member of the sintered resinous component having a porous structure impregnated with lubricant, and a core metal fixed to the lubricant-containing member. The lubricant-containing member is attached to a casing, with interposed between the end face of the end cap and the core metal.

18 Claims, 6 Drawing Sheets

LINEAR MOTION GUIDE UNIT WITH LUBRICATING PLATE ASSEMBLY

BACKGROUND OF THE INVENTION

1. Field of the Invention

The present invention relates to a linear motion guide unit with lubricating plate assemblies, which is applicable to industrial robots, semiconductor manufacturing apparatus, precision instruments, machine tools and the like.

2. Description of the Prior Art

The linear motion guide units have conventionally used incorporated in the parts or components of the industrial robots, semiconductor manufacturing machines or the like, where the precise control is required for reciprocating motion. The recently remarkable development in mechatronics technology extensively requires linear motion guide units. In addition, the linear motion guide units recently become required to meet with needs of increasingly severe operating conditions. For example, the linear motion guide units to be incorporated in the industrial robots for assembly plants, whether the robots are large or miniature in size for wide applications, become required to meet with needs of maintenance-free, along with high precision and high speed in operation. To cope with the needs, the linear motion guide unit has required the self-lubrication of long service life on its relatively movable sliding areas.

A linear motion guide unit as shown in FIG. 15 is conventionally well known and, for example, disclosed in Japanese Patent Publication No. 61046/1991. The prior linear motion guide unit is what is called a ball-spline bearing and composed of a track shaft 2 of a substantially circular cross section having two raceway grooves 3 that extend axially on the peripheral surface of the track shaft, and a cylindrical sliding element, or a slider 1, mounted on the track shaft 2 for sliding movement. The slider 1 may move on the track shaft 2 by virtue of rolling elements 7, or balls, running through the raceway grooves 3 on the track shaft 2 in an endless-circulating manner. The slider 1 includes a casing 5 movable along the track shaft 2 and end caps 6 attached to the lengthwise opposing ends of the casing 5, each to each ends. The casing 5 is of a hollow cylinder having therein raceway grooves 4 confronting the raceway grooves 3 on the track shaft 2, and return passageways 10 for rolling elements 7. A key way 14 is formed on the outer surface of the casing 5 for mounting other appliances, components or parts, chucks and grasping jaws or the like on the slider 1.

The end caps 6 are each provided therein with claws for scooping the rolling elements 7 out of the load raceways defined between the confronting raceway grooves 3, 4 and turnarounds to turn the rolling elements 7 for endless circulation. Mounted on the end caps 6 are end seals 8 for closing clearances between the track shaft 2 and the lengthwise opposing ends of the slider 1 thereby protecting the working area in the slider 1 from dust and dirt. The end seals 8 are usually made of core metals and rubber members of, for example, acrylonitrile-butadiene rubbers. The end caps 6 are fixed together with the end seals 8 to the opposing ends of the casing 5 by fixing bolts or screws 13 fitted in matching holes.

The load raceways defined by the confronting raceway grooves 3, 4, non-loaded turnarounds formed in the end caps 6 and non-loaded return passageways 10 formed in parallel with the raceway grooves 4 in the casing 5, in combination, constitute endless-circulating paths for the rolling elements 7. That is to say, in practice, the balls 7 may run from the raceways into any one of the lengthwise opposing turnarounds, then through the return passageways 10 and the other of the turnarounds, and circulate to the raceways. Thus, the rolling-contact of the balls 7 with the raceways may help ensure the smooth movement of the slider 1 relative of the track shaft 2.

To lubricate the raceways and the rolling elements 7 in the linear motion guide unit constructed as described above, grease or lubricating oil is usually employed. In case of grease, it is applied to the raceways through grease nipples 40 mounted to the end caps 6. In contrast, lubricating oil is supplied to the raceways through pipe joints for the lubricating oil, which are used substituting for the grease nipples.

Nevertheless, as the linear motion guide units becomes common universally with wide applications in various fields, they are increasingly used under unfavorable operating conditions or adverse environments, for example, where no replenishment of lubricating oil is allowed, much dirt and debris may occur and there is abnormally high in temperature or moisture. In recent years much attention has been thus given the development of the linear motion guide units having no fear of lubrication failures even under the severe operating conditions, where it is very hard to achieve the normal lubrication. Disclosed in, for example, Japanese Utility Model Laid-Open No. 4593/1995 is a ball nut and screw assembly including lubricant-containing polymer to ensure the satisfactory operation even under the unfavorable environment where it might be plagued with the difficulties of lubrication.

The prior ball nut and screw assembly is composed of a screw shaft having helical external grooves around the outer periphery thereof, a nut fitted loosely over the screw shaft and provided on the inner surface thereof with helical internal grooves confronting the grooves on the screw shaft, balls running through helical spaces between the confronting helical grooves, and lubricant-containing polymer members arranged so as to make slide-contact with the helical groove surfaces on the screw shaft.

The lubricant-containing polymer members in the prior ball nut and screw assembly are, however, produced by mixing poly(α-olefinic) polymer with a lubricating oil, then melting the mixture with heating in a predetermined mold, and solidifying the molten mixture by cooling. Therefore, the lubricant-containing polymer members have necessarily required the complicated and high technology as well as the high production cost. In addition, it will be understood to those skilled in the art that the technology as to the ball nut and screw assembly may not be directly applied to the linear motion guide units without any modification. It is thus expected to develop an improved lubricating means for the linear motion guide unit what is referred to as a ball-spline, which makes it possible to keep self-lubrication even under too harsh situation for lubrication.

SUMMARY OF THE INVENTION

The present invention has for its primary object to achieve the subject matter as described above, and to provide a linear motion guide unit provided with lubricating plate assemblies that may be simply installed into the presently available linear motion guide unit having a round track shaft, with applying only a little modification to the linear motion guide unit. According to the present invention, the linear motion guide unit of ball-spline type may be provided, which has the lubricating plate assemblies of self-lubrication making it possible to keep desirable lubricating conditions, thereby ensuring the linear motion guide unit an acceptable long service life, improvement in dustproof for cleaning any debris from the guide unit, maintenance-free as for lubricant replenishment and easy production.

The present invention is concerned with a linear motion guide unit comprising an elongated track shaft of solid cylinder and a slider surrounding around the track shaft for sliding movement along the track shaft, wherein the slider includes therein a casing, end caps attached to the casing at its lengthwise opposing ends, each to each end, lubricating plate assemblies arranged on end faces of the end caps, and end seals arranged on end faces of the lubricating plate assemblies, and the lubricating plate assemblies are composed of sintered resinous components of porous structure impregnated with lubricant.

In one aspect of the present invention, a linear motion guide unit is provided wherein the lubricating plate assemblies are each composed of a lubricant-containing member of the sintered resinous component, and a core metal fixed to the lubricant-containing member.

In another aspect of the present invention, a linear motion guide unit is provided wherein the slider is formed therein with a circular aperture, through which the track shaft extends so as to be surrounded around the entire outer periphery thereof. As an alternative, the slider may be mounted on the track shaft in a saddling manner, where the slider surrounds partially the periphery of the track shaft.

In another aspect of the present invention, a linear motion guide unit is provided wherein the track shaft has first raceway grooves extending lengthwise the track shaft while the slider has second raceway grooves confronting the first raceway grooves, and rolling elements are incorporated between the confronting first and second raceway grooves.

The lubricant-containing members are secured to the core metals either with adhesives or with mechanical fixing. The lubricant-containing members are fixed, at their specific areas making a slide-contact with the raceway grooves, to the core metals of supporting members or plates high in rigidity. This results in protecting the lubricant-containing members from deformation at the areas of slide-contact with the raceway grooves, thereby helping ensure reliable slide-contact of the lubricant-containing members with the raceway grooves.

On adhesion of the lubricant-containing members onto the core metals, it is desired to fix the lubricant-containing members onto the core metals at least at only areas neighboring their slide-contact areas with the raceway grooves on the track shaft. To this end, the sintered resinous components must be impregnated with the lubricant after having been adhered onto the core metals, because oily surfaces of the lubricant-containing members make much difficult the adhesion of the members to the core metals.

In contrast, in case of adhering mechanically the lubricant-containing members onto the core metals, the lubricant-containing members are fixed to the core metals by piercing the members with projections, which are formed by raising up parts of the core metals or by implanting pins in the core metals.

In a further another aspect of the present invention, bolts to secure the end seals, lubricating plate assemblies and end caps to the casing are inserted through the holes in the end seals and end caps, and collars fitted in the cuts in the lubricating plate assemblies, and screwed into the openings of the casing. The collars each have the length corresponding to the thickness of the lubricant-containing member whereby the lubricating plate assemblies are fixed to the casing such that the tightening force has little or no effect on the lubricant-containing members.

The lubricating plate assemblies are preferably provided with dustproof coverings for shielding the outer peripheries of the lubricant-containing members.

In another aspect of the present invention, a linear motion guide unit is provided wherein lubricant-containing members are each composed of two lubricant-containing halves, which are arranged in opposite sides of the track shaft and accommodated in the supporting member of the core metal. According to this modification in which lubricant-containing halves are assembled in the supporting members, the lubricant-containing halves are arranged in symmetry with each other and thus they may be produced with less production cost. Moreover, the supporting members are each composed of an annular end wall having a centre aperture for the track shaft, a peripheral side wall extending from the peripheral margin of the end wall to define a spatial area for accommodating the lubricant-containing halves therein, a partition wall for dividing the spatial area into two sub-areas, and reinforcing wall portions rising in the spatial area, which are formed with matching holes.

Fitting the lubricant-containing halves in the spatial area helps ensure the reliable engagement of the lubricant-containing members with the supporting members and, therefore, there is no fear that the lubricant-containing halves fall off the supporting members upon attaching to and detaching from the slider. On mounting or demounting the lubricating plate assembly to the slider, the supporting member has the advantage of not having to touch the lubricant-containing halves impregnated with the lubricating oil, which might otherwise stain the hands of the service man who handles the lubricating plate assembly, because he has only to touch the supporting member. Further, as the lubricant-containing halves are shielded over their outer peripheries with the peripheral side wall of the supporting member even after incorporated into the slider, the lubricant-containing halves are effectively kept from the contamination of the dirt and dust.

In another aspect of the present invention, a linear motion guide unit is provided wherein the supporting members are made of any one of metals, synthetic resins and synthetic rubbers. On assemblage of the slider in which the fixing bolts are screwed into the casing through the end seals, lubricating plate assemblies and end caps, the collars may be eliminated for the metallic supporting members having the reinforcing wall portions sufficient in strength, whereas the rigid collars are required for the synthetic resin-made reinforcing wall portions lacking in strength.

In another aspect of the present invention, a linear motion guide unit is provided wherein the sintered resinous components are fabricated by heating finely powdered synthetic resin under pressure in a design mould. Moreover, the lubricant-containing members should be movable, keeping the slide-contact with the track shaft at least at the raceway grooves.

In a further another aspect of the present invention, a linear motion guide unit is provided wherein the lubricant-containing members are each formed with a cut or opening for receiving therein a grease nipple or lubricating oil-supply pipe joint fitted in the associated end cap. According to this modification, the linear motion guide unit may be lubricated with grease supplied through the grease nipples, besides the self-lubrication of the lubricating plate assemblies.

On the linear motion guide unit constructed as described above, the lubricant-containing members may supply smoothly the lubricant to the raceways between the confronting raceway grooves with no failure of lubrication, thereby helping ensure the good lubrication, reducing the sliding resistance of the slider against the track shaft as well as eliminating the occurrence of wear. The lubricant-containing members may be prepared by impregnating the sintered resinous components of porous structure with any lubricant selected in compliance with the conditions under which the lubricant is used. On the other hand, the lubricant-containing member has only to be made of the resinous material that is selected in accordance with the lubricating oil employed. Consequently, changes on specifications may be admitted easily. The sintered resinous components for the lubricant-containing members may be easily formed with high accuracy of finishing within about ±0.025. This makes it possible to provide the components that are most suitable for the linear motion guide units incorporated into the precision machines.

The lubricating plate assemblies may be used incorporated in most presently available linear motion guide units with no need of changing basic specifications. The lubricating plate assemblies of this invention may be universally adapted to the various types of the linear motion guide units, which differ, for example, in size of the sliders incorporated, as long as the track shaft is identical in its standard members. Moreover, the lubricating plate assemblies may be simply attached to any slider of the linear motion guide units, which has been under operation for machining, thereby contributing to improving the self-lubrication of the linear motion guide units.

The linear motion guide unit having lubricating plate assemblies of the present invention makes possible the self-lubrication even under severe operating conditions, helping ensure the better lubrication for long available service life, thereby achieving the fairly durable operation with maintenance-free for lubricant replenishment.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 15:
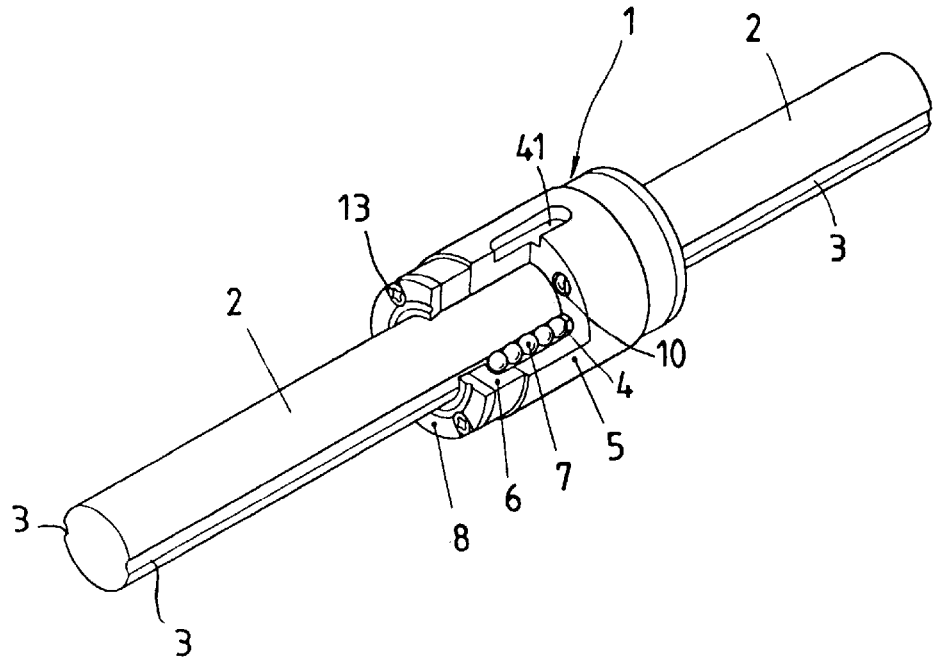
FIG. 15 is a partially cutaway view in perspective of a prior linear motion guide unit.

Referring now in detail to the drawings, the linear motion guide unit according to the present invention will be explained below. In FIGS. 1 to 8 in the accompanying drawings, similar reference characters designate similar elements or components with that of the prior linear motion guide unit shown in FIG. 15.

The linear motion guide unit primarily comprises a track shaft 2 of a round shaft formed on the outer periphery thereof with two raceway grooves 3 extending lengthwise the round shaft, and a cylindrical slider 1 fitted around the track shaft 2 for sliding movement along the track shaft 2. The slider has an axial aperture 45 surrounding the track shaft 2, which is inserted into the aperture 45. The slider 1 is comprised of a casing 5 movable relatively of the track shaft 2 and provided with raceway grooves 4 confronting the raceway grooves 3 on the track shaft 2, rolling elements 7 running through between the confronting raceway grooves 3, 4, and end caps 6 attached to the casing 5 at its ends opposing in the sliding direction of the casing 5, or lengthwise the casing 5. The end caps 6 have each mounted with a lubricating plate assembly 9, which is in turn covered with an end seal 8 for closing clearances between the slider 1 and the track shaft 2 at the lengthwise opposing ends of the slider 1.

The slider 1 may move smoothly along the track shaft 2 by virtue of the rolling elements 7 running through the raceway grooves 3 on the track shaft 2. The rolling elements 7, running through the load raceways defined between the confronting raceway grooves 3, 4, go to turnarounds in any one end cap 6 and then move return passages 10 in the casing 5, further run through turnarounds in another end cap 6 and thereafter go back to the load raceways. Accordingly, the rolling elements 7 run through endless circulating passages composed of the raceways, turnarounds and return passages. Thus, the rolling-contact of the rolling elements 7 with the loaded raceways may help ensure the smooth movement of the slider 1 relative of the track shaft 2.

The linear motion guide unit has lubricating plate assemblies 9 arranged on the end faces of the end caps 6, one to each end cap, for sliding movement in unison with the slider 1 along the track shaft 2. The end seals 8 are arranged on the ends of the lubricating plate assemblies 21 so as to move on the track shaft 2. The lubricating plate assemblies 21 are each composed of a lubricant-containing member 11 of sintered resinous component having porous structure, which is impregnated with lubricating oil, and a core metal 12 on which the lubricant-containing member 11 is fixed.

Figure 5:
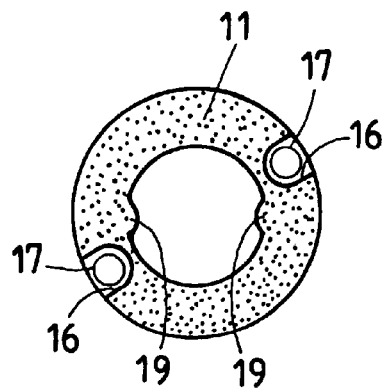
FIG. 5 is a front elevation showing a preferred embodiment of a lubricating plate to be incorporated in the linear motion guide unit shown in FIG. 1.
Figure 6:
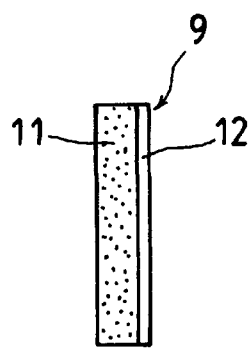
FIG. 6 is a side elevation of the lubricating plate shown in FIG. 5.

The lubricant-containing member 11 has an annular configuration as shown in FIG. 5, which is notched at 16, where collars 17 are disposed for fixing bolts 13 to secure the associated lubricating plate assembly 9 onto the casing 5 or end caps 6. The lubricant-containing member 11 has on the inner periphery thereof convexities 19 raised radially inwardly to at least the extent, where they may make a sliding contact with the raceway grooves 3 on the track shaft 2 to lubricate constantly the raceway grooves 3 with the lubricant or lubricating oil soaked in the sintered resinous component. Although the lubricant-containing member 11 may be brought into sliding engagement with the track shaft 2 over the entire inner surface of the lubricant-containing member 11, the engagement at only the raceway grooves 3 may be sufficient in accordance with the operating conditions from the view point of reducing the lubricant consumption. Any lubricant-containing member 11 is composed of a sintered resinous component, which is fabricated by heating finely powdered synthetic resin under high pressure in a mould. The sintered resinous component for the lubricant-containing member 11 is of a porous structure including therein continuous voids, which is produced, for example, by filling a preselected mould with the powdery ultrahigh molecular weight polyethylene resin having the grading of 30 $\mu$m in fine grain size and from 250 $\mu$m to 300 $\mu$m in coarse grain size, and then heating the molded resin under high pressure. The sintered resinous component for the lubricant-containing member 11 preferably has the porous structure of the porosity of, for example, from 40% to 50%. The lubricant-containing member 11 is prepared by immersing the sintered porous resin component with turbine oil for the lubricating oil thereby impregnating the voids with the lubricating oil. Dipping the sintered resinous component into, for example, turbine oil for about 30 minutes may provides the lubricant-containing member 11 that is regulated at percentage of lubricating oil content of 41% by weight and thus at oil content of about 2 cc. Percentage of lubricating oil content may be controlled in accordance with the operating condition of the slider 1.

Figure 7:
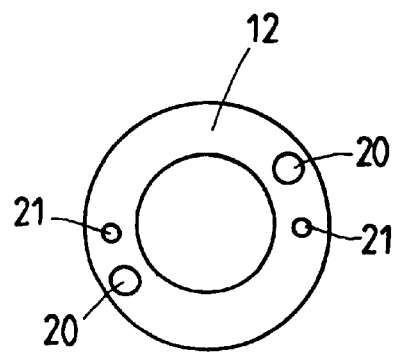
FIG. 7 is a front elevation showing a core metal to be fixed to the lubricating plate shown in FIG. 5.
Figure 8:
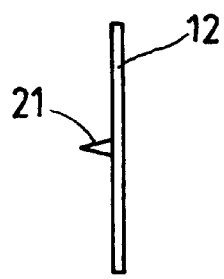
FIG. 8 is a side elevation of the core metal shown in FIG. 7.

The core metal 12 for the lubricating plate assembly 9, as shown in FIGS. 7 and 8, includes matching holes 20 for fixing bolts 13 and projections 21 such as sharpened pins, claws and the like to pin the lubricant-containing member 11 to the core metal 12. The pins 21 may be formed simultaneously with punching out the matching holes 20. As an alternative, the pins 21 may be attached to the core metal 12 by, for example, welding. The alternative to the pins may be projections that are raised up to one side by stamping, and sharpened in the form of pointed claws. A sintered resinous component for the lubricant-containing member 11 is secured to the core metal 12 by piercing it with the pins 21 and, then, immersed with lubricant, thereby obtaining the lubricating plate assembly 9. As an alternative, the sintered resinous component is first immersed with lubricant to obtain the lubricant-containing member 11, which is in turn secured to the core metal 53 by piercing it with the pins 21, resulting in the lubricating plate assembly 9.

On incorporating any lubricating plate assembly 9 to the slider 1, fixing bolts 13 extend through holes 14 in the end seal 8, collars 17 arranged in the notches 16 in the lubricant-containing member 11 of the lubricating plate assembly 9, and further extend holes 15 in the end cap 6 to be screwed into matching holes 18 in the casing 5, whereby the slider 1 may be assembled completely. The collars 17 are interposed between the end seal 8 and the core metal 12 in such a manner that they are abutted at their opposing ends against the end seal 8 and the core metal 12 to thereby keep a space, which corresponds in width to the thickness of the lubricant-containing member 11. Each collar 17 has an axial length corresponding to the thickness of the lubricant-containing member 11 and, therefore, the clamp-down forces created by the bolts 13 may act on the end seals 8, collars 17, core metals 12 and end caps 6 so as to press them together, but has little or no effect on the lubricant-containing members 11, each of which is then saved at its sliding-contact portions with the raceway grooves 3 on the track shaft 2 from the deformation owing to the clamping force applied by the bolts 13.

The lubricant-containing member 11 is adhered to the core metal 12 of high stiffness and, therefore, even if the lubricant-containing member 11 is subject to the external force great to cause its deformation, the core metal 12 resists the deformation of the convexities 19 to keep the accuracy of their sliding surfaces with respect to the raceway grooves 3. As a result, the convexities 19 of the lubricant-containing member 11 are kept from not only excessive pressing against the raceway grooves 3, but also separation away from the raceway grooves 3, thereby capable of incessantly supplying the sufficient lubricant to the raceway grooves 3 with no increase of the sliding resistance to the raceway grooves 3. Moreover, dustproof covers, not shown, may be provided so as to surround the lubricant-containing members 11 thereby keeping the lubricant-containing members 11 from the contamination of the dust and dirt, preventing the lubricant-containing member 11 from the breakage as well as the leakage of lubricating oil.

Figure 9:
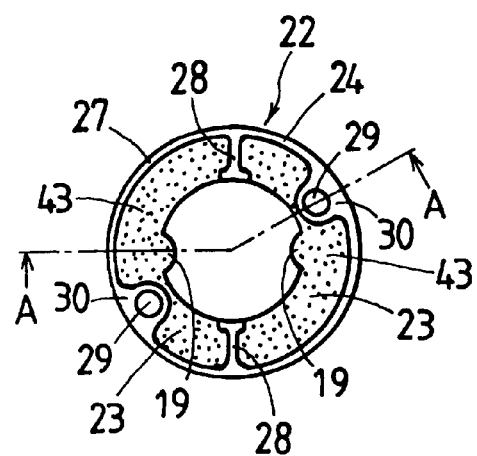
FIG. 9 is a front elevation of another embodiment of a lubricating plate assembly to be incorporated in linear motion guide unit in FIG. 1.
Figure 10:
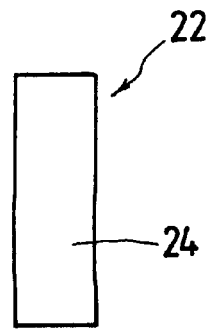
FIG. 10 is a side elevation of the lubricating plate assembly shown in FIG. 9.
Figure 11:
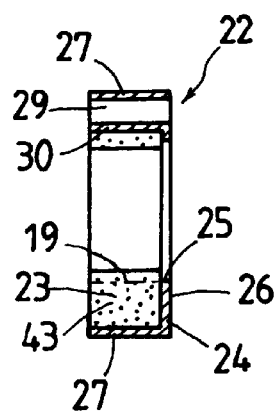
FIG. 11 is a section view taken along the line A—A of FIG. 9.

Next, another embodiment of the lubricating plate assembly adapted for the linear motion guide unit of the present invention will be explained below in reference with FIGS. 9 to 11.

Compared with the embodiment described just above, the second embodiment is substantially identical in structure and function, except for the structure of a lubricant-containing member 11 and, therefore, like parts or components have been given the same reference characters, so that the previous description will be applicable.

A lubricating plate assembly 22 is composed of a pair of lubricant-containing halves 23, 23 arranged in opposite sides of the track shaft 2, and a supporting member 24 considered the core metal, where the lubricant-containing halves 23, 23 are contained therein. The lubricant-containing halves 23, 23 are each formed in a roughly semicircular configuration, on the inner peripheral surface of which are formed convexity 19 to be brought into slide-contact with the associated raceway groove 3 on the track shaft 2. Thus the lubricant-containing halves 23, 23 are arranged in the supporting member 24 at the opposite sides of the track shaft 2 with the convexities 19 thereof making slide-contact with the raceway grooves 3 on the track shaft 2, each to each groove.

The supporting member 24 includes an annular end wall 23 having a centre aperture 25 for the track shaft 2, a peripheral side wall 27 extending from the peripheral margin of the end wall 26 to define a spatial area 43 for accommodating the lubricant-containing halves 23, 23 therein, a partition wall 28 for dividing the spatial area 43 into two sub-areas, and reinforcing wall portions 30 formed with matching holes 29 for the fixing bolts 13. The peripheral side wall 27 of the supporting member 24 surrounds the outer surfaces of the lubricant-containing halves 23, 23 to shield the exposed voids of the porous structure, thereby protecting the lubricant-containing halves 23, 23 from the contamination of dust and dirt and also the unexpected breakage as well as the leakage of lubricating oil. The peripheral side wall 27 has the further advantage of not having to touch the lubricant-containing halves 23, 23 impregnated with the lubricating oil, which might otherwise stain the hands of the service man who handles the lubricating plate assembly 22, because he has only to touch the supporting member 24.

The supporting member 24 may be made of any one of metals, synthetic resins, synthetic rubbers and the like. In order to render the lubricating plate assembly 22 easy to handle, it is preferred to make the supporting member 24 out of a specific material, which may be elastically distorted once, for example, on incorporating the lubricating plate assembly 22 into the slider 1 or on the track shaft 2, and then restored to the own original posture after its setting. Also on assembling the lubricant-containing halves 23, 23 with the supporting member 24, the restorable distortion of the supporting member 24 results in easy mounting of the lubricant-containing halves 23, 23. In addition, notwithstanding the lubricating plate assemblies 22 being left fitted on the on the track shaft 2 together with the end caps 6 and the end seals 8, only the lubricant-containing halves 23, 23 may be simply attached or detached.

The supporting members 24 each have holes 29 bored in alignment with the matching holes in the associated end cap 6 and end seal 8, which sandwich the supporting member 24 between them. The fixing bolts 13 are extended through the associated holes in the end seal 8, supporting member 24 and end cap 6, and then screwed into the matching holes 18 in the casing 5, whereby the combination of the end seal 8, supporting member 24 and end cap 6 is mounted onto the casing 5.

Accordingly, the supporting members 24 are each held sandwiched between the associated end cap 6 and end seal 8. In case where the supporting member 24 is made of synthetic resins or synthetic rubbers and the reinforcing portions 30 are inferior in strength, it will be recommended to insert the collars 17, each of which has the axial length equal with the total thickness of the supporting member 24 and the lubricant-containing halves 23, 23, into the holes 29. On mounting the lubricating plate assemblies with the bolts 13 extending through the collars 17, the clamp-down forces created by the bolts may be partly shared with the collars 17 so that the supporting members 24 may be protected from undue clamp-down forces of the bolts 13.

As the lubricant-containing halves 23, 23 are arranged in symmetry in the opposite sides of the track shaft 3, they may be made identical in shape and thus incorporated in the supporting member 24 by only reversing any one to the other with respect to the track shaft 2. Therefore, only one type of mold is sufficient for producing the lubricant-containing halves 23, 23. This is advantageous to mass-producing the lubricant-containing halves 23, 23 fixed in shape and size, resulting in reducing the production cost.

Figure 12:
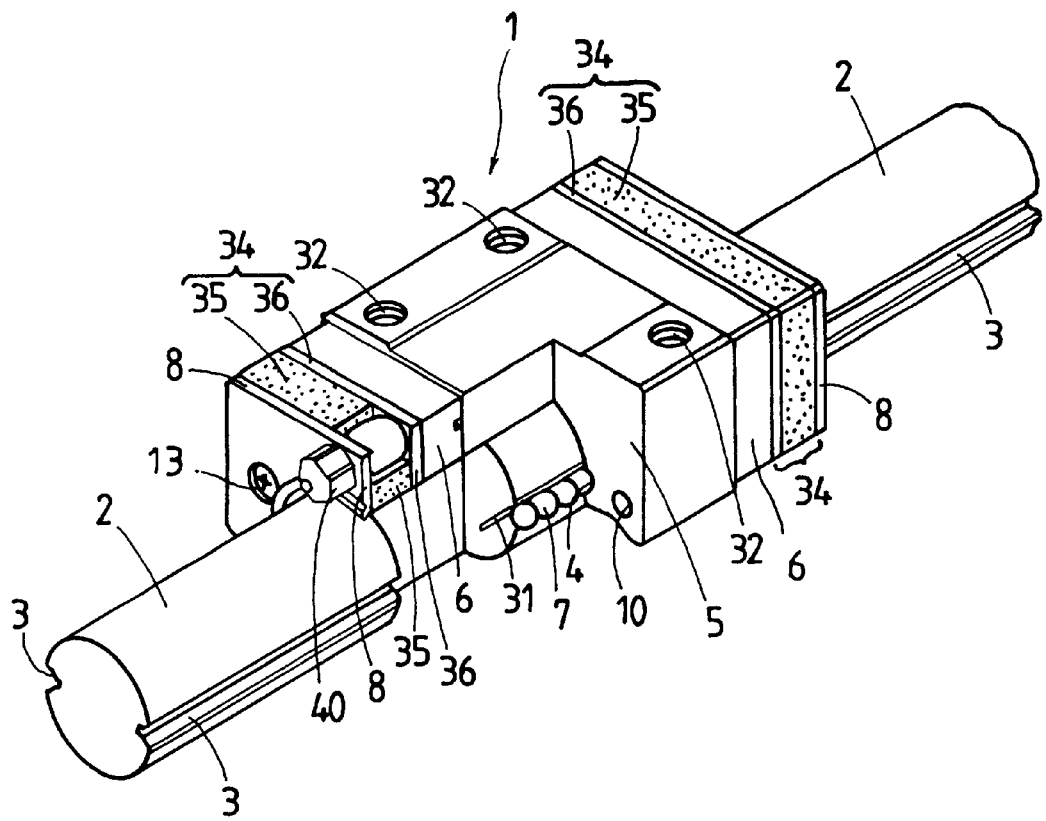
FIG. 12 is a partially cutaway view in perspective of another embodiment of the linear motion guide unit according to the present invention.
Figure 13:
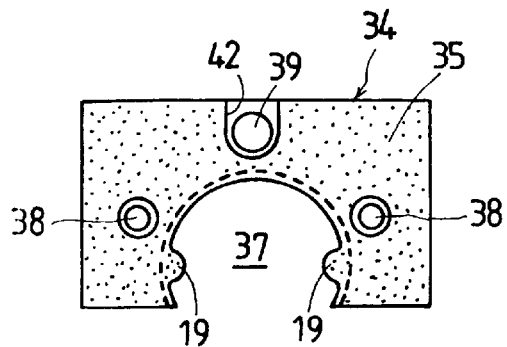
FIG. 13 is a front elevation showing a lubricating plate assembly to be adapted for the linear motion guide unit shown in FIG. 12.
Figure 14:
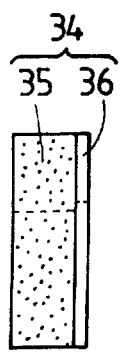
FIG. 14 is a side elevation of the lubricating plate assembly shown in FIG. 13.

The following explains another embodiment of the linear motion guide unit according to the present invention in conjunction with FIGS. 12 to 14.

Figure 1:
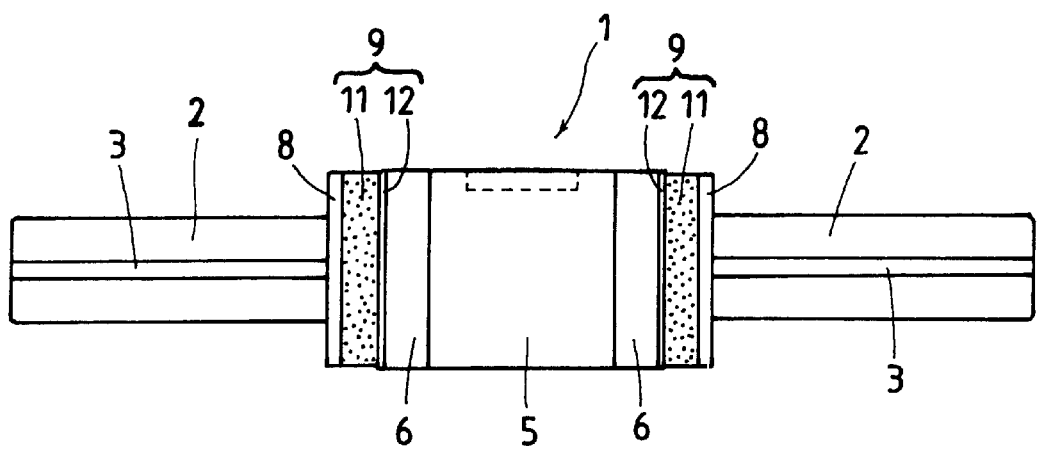
FIG. 1 is a side elevation showing a preferred embodiment of a linear motion guide unit according to the present invention.
Figure 2:
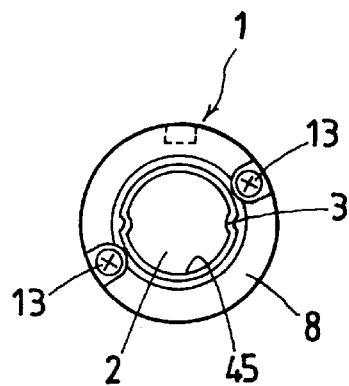
FIG. 2 is a front elevation of the linear motion guide unit shown in FIG. 1.
Figure 3:
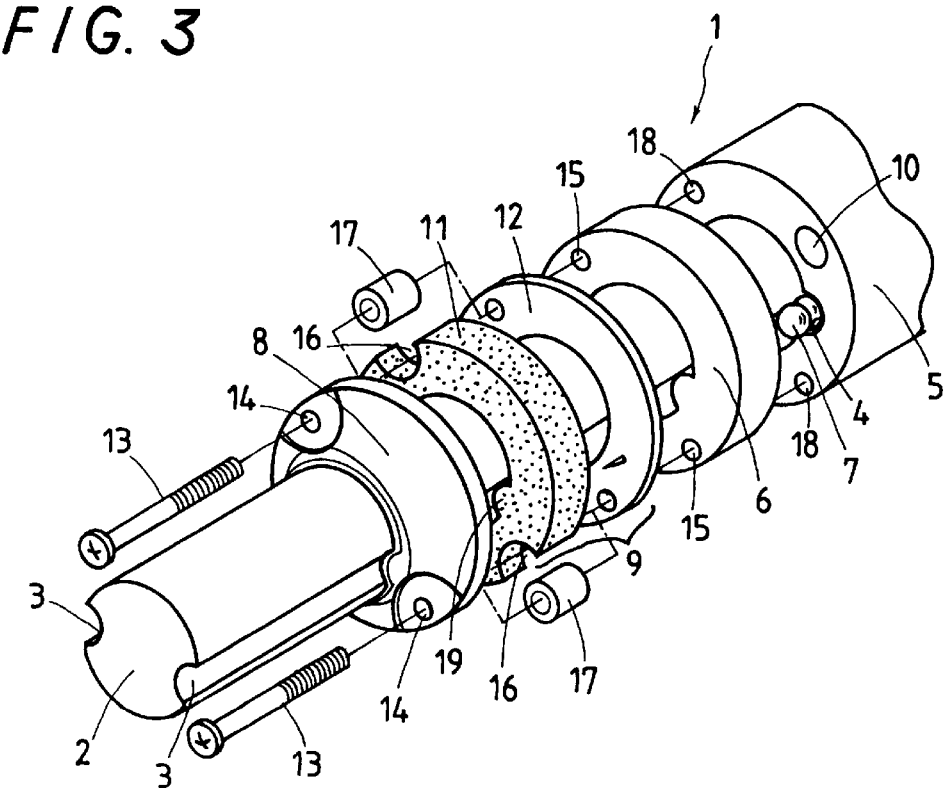
FIG. 3 is a fragmentary exploded perspective view of the linear motion guide unit shown in FIG. 1.
Figure 4:
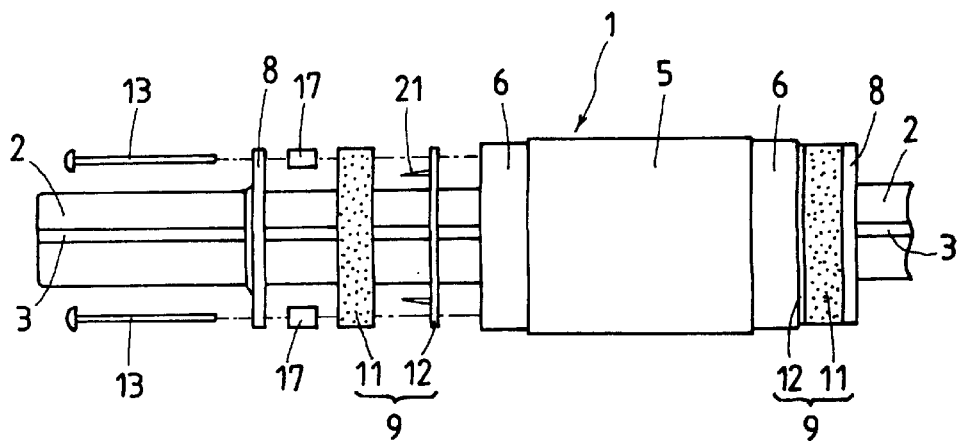
FIG. 4 is an exploded side elevation of the linear motion guide unit shown in FIG. 1.

This second embodiment is identical in the track shaft 2, but different in the configuration of the slider 1, compared with the first embodiment in FIG. 1.

The slider 1 of rectangle in appearance saddles the track shaft 2 for sliding movement along the track shaft 2. The slider 1 has a casing 5 movable with respect to the track rail 2 and formed with raceway grooves 4 confronting the raceway grooves 3, rolling elements 7 running through raceways defined between the confronting raceway grooves 3, 4, end caps 6 attached to the casing 5 at its ends opposing in the sliding direction or lengthwise, and lubricating plate assemblies 34 attached on the end faces of the end caps 6, each to each end cap. End seals 8 are provided so as to cover the end caps 6. Moreover, retainer bands 18 are provided in the casing 5 so as to embrace the rolling elements 7 to thereby prevent the rolling elements 7 from falling out of the casing 5. Provided on the upper surface of the casing 5 are openings 32 for fixture, by which other appliances are mounted on the slider 1. Bottom seals, not shown, are secured to the lower surfaces of the end caps 6 and the casing 5 for closing clearances between the track shaft 2 and both the end caps 6 and the casing 5. Further, the end caps 6 are provided with grease nipples 40 through which grease may be supplied to the raceways. The slider 1 may move along the track shaft 2, saddling the track shaft 2, by virtue of rolling elements 7 running through the raceways. The rolling elements 7 may run from the raceways into the turnarounds in the end caps 6, then through the return passageways 10, thereby running along the endless-circulating paths.

The lubricating plate assemblies 34 are each composed of a lubricant-containing member 35 of sintered resinous component having porous structure, which is impregnated with lubricating oil, and a core metal 36 on which the lubricant-containing member 35 is fixed. The lubricant-containing member 35 of a rectangular shape in front elevation has at the lower area thereof a roughly circular aperture 37 for the track shaft 2, and is also formed with matching holes 38 for the fixing bolts opposing across the aperture 37 and an opening 39 for the grease nipple positioned above the aperture 37. Inserted in the matching holes 38 are the collars 17 of the axial length equal to the thickness of the lubricant-containing member 35. Provided on the inner periphery of the lubricant-containing member 35 are convexities 19 that are raised radially inwardly to at least the extent, where they may make a sliding contact with the raceway grooves 3 on the track shaft 2 to lubricate constantly the raceway grooves 3 with the lubricant or lubricating oil soaked in the sintered resinous component. Although the lubricant-containing member 35 may be brought into sliding engagement with the raceway grooves 3 over the entire inner surface of the lubricant-containing member 35, it is preferable, from the view point of reducing the lubricant consumption, that the lubricant-containing member 35 is in engagement with the track shaft 2 at only the raceway grooves 3 in accordance with the operating conditions. The sintered resinous component for the lubricant-containing member 35, as is the case for the embodiment shown in FIG. 1, may be produced by heating finely powdered synthetic resins in the mould under high pressure. The quality and fabricating process of the lubricant-containing member are the same as the first embodiment previously described in conjunction with FIG. 1, so that the previous description will be applicable.

According to this embodiment, the lubricant-containing member 35 is adhered to the core metal 36 with adhesives. The lubricant-containing member 35 of the powdery ultra-high molecular weight polyethylene resin may be easily adhered to the core metal 36 by using the adhesives of epoxy resin. Moreover, the sintered resinous component is preferably immersed with the lubricant, after having been fixed to the core metal 36 with the adhesives. In the embodiment shown, although the lubricant-containing member 35 is adhered over its entire surface to the core metal 36 with the adhesives, local adhesion neighboring the convexities 19 may be sufficient. On this design of local adhesion in which the lubricant-containing member 35 is adhered to the rigid core metal 36 at only the area neighboring the convexities 19, even if the lubricant-containing member 35 is subject to the external force great to cause its deformation, the core metal 36 resists the deformation of the convexities 19 to keep the accuracy of their sliding surfaces with respect to the raceway grooves 3. As a result, the convexities 19 of the lubricant-containing member 35 are kept from not only excessive pressing against the raceway grooves 3, but also separation away from the raceway grooves 3, thereby capable of incessantly supplying the sufficient lubricant to the raceway grooves 3 with no increase of the sliding resistance to the raceway grooves 3.

By inserting the fixing bolts 13 through in turn the holes 14 in the end seals 8, the collars 17 fitted in the holes 38 in the lubricant-containing members 35, and holes 15 in the end caps 6, and screwing the bolts into the matching holes 18 in the casing 5, the linear motion guide unit of the present invention is assembled. It is to be noted that the collars 17 interposed between the end seals 8 and the core metals 36 are to hold the lubricant-containing members 35 between the end seals 8 and the core metals 36, relieving the lubricant-containing members 35 of the direct compressive clamping force caused by the fixing bolts 13, to thereby protect the lubricant-containing members 35 from the undue deformation owing to the clamping force of the fixing bolts 13. Depending on the situation, it is required to apply lubricant or lubricating oil to the raceway grooves from the outside, in addition to the self-lubrication system. In assembly of the linear motion guide unit, the grease nipples 40 are each fitted into the associated opening 39 in the core metal 39, a cut 42 in the lubricant-containing member 35 and matching holes in the end seal 8 and casing 5 whereby the raceways for the rolling elements 7 may be lubricated with grease supplied through the grease nipples 40, besides the self-lubrication of the lubricating plate assemblies 34.

While the present invention has been described in its preferred embodiments, it is to be understood that the words which have been used are words of description rather than limitation and that changes within the purview of the appended claims may be made without departing from the true scope and spirit of the invention in its broader aspect.

What is claimed is:

1. A linear motion guide unit comprising an elongated track shaft of solid cylinder and a slider surrounding around the track shaft for sliding movement along the track shaft, wherein the slider includes therein a casing, end caps attached to the casing at its lengthwise opposing ends, each to each end, lubricating plate assemblies arranged on end faces of the end caps, and end seals arranged on end faces of the lubricating plate assemblies, and the lubricating plate assemblies are composed of sintered resinous components of porous structure impregnated with lubricant, wherein the lubricating plate assemblies are each composed of a lubricant-containing member of the sintered resinous component, and a core metal fixed to the lubricant-containing member, and wherein the lubricant-containing members are fixed to the core metals by piercing the members with projections which are formed by raising up parts of the core metals.

2. A linear motion guide unit constructed as defined in claim 1, wherein the slider is formed therein with a circular aperture, through which the track shaft extends so as to be surrounded around the entire outer periphery thereof.

3. A linear motion guide unit constructed as defined in claim 1, wherein the slider is mounted on the track shaft in a saddling manner.

4. A linear motion guide unit constructed as defined in claim 1, wherein the track shaft has first raceway grooves extending lengthwise the track shaft and the slider has second raceway grooves confronting the first raceway grooves whereby the confronting first and second raceway grooves define raceways for allowing rolling elements to run therethrough.

5. A linear motion guide unit constructed as defined in claim 4, wherein the lubricating plate assemblies are each slideable along the track shaft with making a slide-contact to at least the first raceway grooves on the track shaft.

6. A linear motion guide unit constructed as defined in claim 4, wherein the lubricant-containing members are each adhered to the associated core metal at least at local areas neighboring its portions which are brought into slide-contact with the first raceway grooves on the track shaft.

7. A linear motion guide unit constructed as defined in claim 1, wherein the lubricant-containing members are impregnated with the lubricant after being adhered onto the core metals.

8. A linear motion guide unit constructed as defined in claim 1, wherein fixing bolts to secure the end seals, lubricating plate assemblies and end caps are inserted through holes in the end seals and end caps, and collars fitted in cuts in the lubricating plate assemblies, and screwed into matching holes in the casing.

9. A linear motion guide unit constructed as defined in claim 1, wherein dustproof coverings are provided for shielding the lubricant-containing members.

10. A linear motion guide unit constructed as defined in claim 1, wherein the sintered resinous components are fabricated by heating finely powdered synthetic resin under pressure in a design mould.

11. A linear motion guide unit constructed as defined in claim 1, wherein the lubricant-containing members are each formed with any one of cut and opening for receiving therein a grease nipple fitted in the associated end cap.

12. A linear motion guide unit constructed as defined in claim 1, wherein the lubricant-containing members are each formed with any one of cut and opening for receiving therein a lubricating oil-supply pipe joint fitted in the associated end cap.

13. A linear motion guide unit comprising an elongated track shaft of solid cylinder and a slider surrounding around the track shaft for sliding movement along the track shaft, wherein the slider includes therein a casing, end caps attached to the casing at its lengthwise opposing ends, each to each end, lubricating plate assemblies arranged on end faces of the end caps, and end seals arranged on end faces of the lubricating plate assemblies, and the lubricating plate assemblies are composed of sintered resinous components of porous structure impregnated with lubricant, wherein the lubricating plate assemblies are each composed of a lubricant-containing member of the sintered resinous component, and a core metal fixed to the lubricant-containing member, wherein the core metal provides a supporting member for the associated lubricant-containing member, and wherein the supporting member includes an annular end wall having a center aperture for the track shaft, a peripheral side wall extending from the peripheral margin of the end wall to define a spatial area for accommodating the lubricant-containing halves therein, a partition wall for dividing the spatial area into two sub-areas, and reinforcing wall portions rising in the spatial area, which are formed with matching holes.

14. A linear motion guide unit constructed as defined in claim 13, wherein lubricant-containing members are each composed of two lubricant-containing halves, which are arranged in opposite sides of the track shaft and accommodated in the supporting member of the core metal.

15. A linear motion guide unit constructed as defined in claim 13, wherein the supporting members are made of any one of metals, synthetic resins and synthetic rubbers.

16. A linear motion guide unit as defined in claim 13, wherein the sintered resinous components comprise finely powdered synthetic resin consolidated under heat and pressure in a mould.

17. A linear motion guide unit as defined in claim 13, wherein the lubricant-containing members are each formed with any one of a cut and an opening for receiving therein a grease nipple fitted in the associated end cap.

18. A linear motion guide unit as defined in claim 13, wherein the lubricant-containing members are each formed with any one of a cut and an opening for receiving therein a lubricating oil-supply pipe joint fitted in the associated end cap.

* * * * *